(12) United States Patent
Sugiura et al.

(10) Patent No.: US 6,858,338 B2
(45) Date of Patent: Feb. 22, 2005

(54) SOLID POLYMER ELECTROLYTE FUEL CELL ASSEMBLY, FUEL CELL STACK, AND METHOD OF SUPPLYING REACTION GAS IN FUEL CELL

(75) Inventors: Seiji Sugiura, Utsunomiya (JP); Yoshinori Wariishi, Utsunomiya (JP); Naoyuki Enjoji, Utsunomiya (JP); Narutoshi Sugita, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 136 days.

(21) Appl. No.: 10/093,235

(22) Filed: Mar. 6, 2002

(65) Prior Publication Data

US 2002/0146601 A1 Oct. 10, 2002

(30) Foreign Application Priority Data

Mar. 6, 2001 (JP) ........................ 2001-061527

(51) Int. Cl.$^7$ .......................... H01M 8/10; H01M 8/04
(52) U.S. Cl. .............................. 429/32; 429/26; 429/39
(58) Field of Search .............................. 429/32, 38, 39, 429/26

(56) References Cited

U.S. PATENT DOCUMENTS

| | | | | |
|---|---|---|---|---|
| 5,252,409 A | | 10/1993 | Akagi | 429/32 |
| 6,214,486 B1 | * | 4/2001 | Okamoto | 429/13 |
| 6,277,511 B1 | * | 8/2001 | Iwase et al. | 429/32 |
| 6,395,416 B1 | * | 5/2002 | Tanemoto et al. | 429/34 |
| 6,440,598 B1 | * | 8/2002 | Fukui et al. | 429/34 |
| 6,566,002 B2 | * | 5/2003 | Yoshimoto et al. | 429/32 |
| 2002/0146612 A1 | * | 10/2002 | Sugiura et al. | 429/32 |

FOREIGN PATENT DOCUMENTS

JP      11-67258    *   3/1999       H01M/8/24

* cited by examiner

*Primary Examiner*—Stephen J. Kalafut
(74) *Attorney, Agent, or Firm*—Lahive & Cockfield, LLP; Anthony A. Laurentano, Esq.

(57) ABSTRACT

A cell assembly includes a first unit cell and a second unit cell stacked to each other. The first unit cell includes a first unified body, and the second unit cell includes a second unified body. In the cell assembly, oxidizing gas passages and fuel gas passages are provided in parallel along the first and second unit cells.

16 Claims, 15 Drawing Sheets

SOLID POLYMER ELECTROLYTE FUEL CELL ASSEMBLY, FUEL CELL STACK, AND METHOD OF SUPPLYING REACTION GAS IN FUEL CELL

BACKGROUND OF THE INVENTION

1. Field of the Invention

The present invention relates to a solid polymer electrolyte fuel cell assembly including a plurality of unit cells stacked to each other, wherein each of the unit cells integrally has a unified body formed by holding a solid polymer electrolyte membrane between an anode and a cathode; a fuel cell stack obtained by stacking a plurality of sets of the solid polymer type cell assemblies to each other; and a method of supplying a reaction gas in the fuel cell.

2. Description of the Related Art

In general, a solid polymer electrolyte fuel cell (PEFC) includes a unit cell (unit power generation cell) formed by disposing an anode and a cathode, each of which is mainly made from carbon, on both sides of an electrolyte membrane composed of a polymer ion exchange membrane (cation exchange membrane), to form a unified body (membrane-electrode assembly), and holding the unified body between separators (bipolar plates). The solid polymer electrolyte fuel cell is generally used in the form of a fuel cell stack composed of a stack of a specific number of the unit cells.

In the fuel cell of this type, when a fuel gas, for example, a gas mainly containing hydrogen (hereinafter, referred to as "hydrogen containing gas") is supplied to the anode, hydrogen in the hydrogen containing gas is ionized on the catalyst electrode and is migrated to the cathode via the electrolyte; and electrons generated by such cell reaction are taken to an external circuit, to be used as electric energy in the form of a direct current. In this case, since an oxidizing gas, for example, a gas mainly containing oxygen or air (hereinafter, referred to as "oxygen containing gas") is supplied to the cathode, hydrogen ions, electrons and oxygen react with each other to produce water on the cathode.

By the way, in the case of using a fuel cell stack as an on-vehicle power source, a relatively large output is required for the fuel cell stack. To meet such a requirement, a cell structure for making a size of a reaction plane (power generation plane) of a unit cell larger, and a cell structure for stacking a large number of unit cells to each other have been adopted.

The former cell structure, however, has a problem that if the size of each unit cell becomes large, the whole size of the fuel cell stack becomes also large, and such a large-sized fuel cell stack is unsuitable as an on-vehicle power source. Accordingly, the latter cell structure for stacking a large number of relatively compact unit cells to each other has been generally adopted; however, such a structure also presents an inconvenience that as the number of the stacked unit cells becomes larger, the temperature distribution tends to be generated in the stack direction and also the drainage characteristic of water produced by the electrochemical reaction is degraded, thereby failing to ensure a desired power generation performance.

SUMMARY OF THE INVENTION

It is an object of the present invention to provide a solid polymer electrolyte fuel cell assembly capable of effectively improving the power generation performance of each unit cell and reducing the size of the cell assembly with a simple structure, and a fuel cell stack obtained by stacking the cell assemblies to each other.

Another object of the present invention is to provide a method of supplying a reaction gas in a fuel cell, which is capable of making each unit cell effectively generate a power, and improving the drainage characteristic or the like.

According to the present invention, there is provided a solid polymer electrolyte fuel cell assembly including a plurality of unit cells stacked to each other, characterized in that each of the plurality of units cells integrally has a unified body formed by holding a solid polymer electrolyte membrane between an anode and a cathode, and also has one of a plurality of sets of reaction gas passages adapted for allowing at least one of a fuel gas and an oxidizing gas to flow in the unit cells in parallel with respect to the stacking direction of the unit cells and in the same flow direction. With this configuration, it is possible to keep a desirable power generation performance for each unit cell.

Further, since the cell assembly is composed of a plurality of the unit cells integrated to each other, the fuel cell stack can be assembled with each cell assembly taken as a handling unit. Accordingly, at the time of assembly of the fuel cell stack, works of handling the components of the fuel cell stack can be effectively improved as compared with works of handing the components of a conventional fuel cell stack which is assembled with each of the unit cells taken as a handling unit.

In the above cell assembly, two sets of coolant passages for cooling the cell assembly may be disposed on both sides of the plurality of unit cells in the stacking direction of the unit cells in such a manner as to hold the unit cells therebetween. With this configuration, as compared with a cooling structure in which a set of coolant passages are provided for each unit cell, the cooling structure of the present invention can be effectively simplified, thereby making it possible to easily reduce the size and weight of the whole cell assembly. Each of the two sets of coolant passages may be configured to extend linearly along a plane direction of the unit cells. With this configuration, the configuration of each set of the coolant passages can be simplified.

In this case, at least two of the unit cells may have structures different from each other. With this configuration, it is possible to adopt a structure optimum for reaction for each unit cell. For example, the cross-sections of at least two, provided in the at least two unit cells, of the plurality of sets of reaction gas passages for allowing at least one of the fuel gas and oxidizing gas to flow therethrough may be different from each other. With this configuration, even if there occur different temperature environments in each unit cell, it is possible to generate efficient and uniform reaction for each unit cell.

Concretely, the cross-sections of the at least two sets of reaction gas passages provided in the at least two unit cells may be made different from each other by making the depths, widths, or the number of one of the at least two sets of reaction gas passages different from the depth, widths, or the number of another of the at least two sets of reaction gas passages. With this configuration, by making the depths of the passages shallow, it is possible to make each unit cell thin, and hence to miniaturize the whole cell assembly; and by making the widths of the passages narrow or reducing the number of the passages, it is possible to increase the contact area between the unit cells and hence to lower the contact resistance.

The cross-sections of one, disposed in proximity to the coolant passages, of the at least two sets of reaction gas passages may be smaller than another, disposed apart from the coolant passages, of the at least two sets of reaction gas passages. Since the temperature of the reaction gas passages disposed in proximity of the coolant passages is lower than that of the reaction gas passages apart from the coolant passages, the amount of water produced in the former reaction gas passages becomes larger than that of water produced in the latter reaction gas passages; however, according to this configuration, since the cross-sections of the former reaction gas passages are smaller than those of the latter reaction gas passages, the flow velocity of the reaction gas in the former reaction gas passages becomes higher, with a result that the drainage characteristic of water produced in the former reaction gas passages can be effectively improved.

A choked portion may be provided in one, disposed apart from the coolant passages, of the at least two sets of reaction gas passages in order to make the flow rate of the one of the at least two sets of reaction gas passages smaller than the flow rate of another, disposed in proximity to the coolant passages, of the at least two sets of reaction gas passages. With this configuration, it is possible to increase the flow rate of the reaction gas passages on the low temperature side, and hence to equalize the humidity in the unit cell.

The at least two unit cells may have unified bodies different from each other. Concretely, one, disposed in proximity to the coolant passages, of the unified bodies may include a fluorine based membrane, and another, disposed apart from the coolant passages, of the unified bodies may include a hydrocarbon based membrane. With this configuration, since the hydrocarbon based membrane having a high heat resistance is provided in the unified body which is apart from the coolant passages and is thereby high in temperature, it is possible to improve the useful life of the unified body.

Each separator interposed between adjacent two of the unified bodies may have, in a plane thereof, a reaction gas supplying communication hole and a reaction gas discharging communication hole for supplying and discharging the reaction gas to and from the reaction gas passages in each of the unit cells. With this configuration, it is possible to improve the drainage characteristic of produced water, and to eliminate provision of a seal structure in the case of providing a separate external manifold.

Each separator interposed between adjacent two of the unified bodies may be formed of a metal plate having a shape of projections and depressions for forming the reaction gas passages. With this configuration, since the separator can be formed of a corrugated metal thin plate, it is possible to realize the thinning of the separator. The separator may have, on the side facing to one of the adjacent two of the unified bodies, a set of fuel gas passages as the reaction gas passages of one kind, and also have, on the side facing to the other of the adjacent two of the unified bodies, a set of oxidizing gas passages as the reaction gas passages of the other kind. With this configuration, as compared with a separator structure in which a set of fuel gas passages and a set of oxidizing gas passages are individually provided for two separators, it is possible to easily make the separator structure thin, and hence to miniaturize the whole cell assembly.

The flow direction of a set of fuel gas passages as the reaction gas passages of one kind along the reaction plane of the unit cell may be opposite to the flow direction of a set of oxidizing gas passages as the reaction gas passages of the other kind along the reaction plane of the unit cell. With this configuration, since water produced in a portion, on the outlet side, of the oxidizing gas passages are diffused back in the fuel gas passages via the electrolyte membrane, it is possible to effectively humidify the fuel gas.

Sets of fuel gas passages may be provided in the plurality of unit cells in such a manner as to be communicated to each other in series, and sets of oxidizing gas passages may be provided in the plurality of unit cells in such a manner as to be communicated to each other in parallel. With this configuration, since a sufficiently large pressure drop can be given to the fuel gas having a low viscosity flowing in the fuel gas passages, it is possible to effectively drain water produced on the anode. A set of fuel gas passages may be configured to extend linearly along the reaction plane of the unit cell, and a set of oxidizing gas passages may be configured to extend linearly along the reaction plane of the unit cell. With this configuration, it is possible to simplify the configurations of the fuel gas passages and the oxidizing gas passages.

According to the present invention, there is provided a fuel cell stack including a plurality of sets of cell assemblies stuck to each other, characterized in the solid polymer electrolyte fuel cell assembly includes a plurality of unit cells stacked to each other, wherein each of the plurality of units cells integrally has a unified body formed by holding a solid polymer electrolyte membrane between an anode and a cathode, and also has one of a plurality of sets of reaction gas passages adapted for allowing at least one of a fuel gas and an oxidizing gas to flow in the unit cells in parallel with respect to the stacking direction of the unit cells and in the same flow direction.

With this configuration, since each unit cell can keep a desirable power generation performance, the fuel cell stack can obtain a desirable power generation performance as a whole. In this fuel cell stack, the at least two of the unit cells may have structures different from each other.

According to the present invention, there is provided a method of supplying a reaction gas in a fuel cell, which is applied to a solid polymer electrolyte fuel cell assembly. The cell assembly includes a plurality of unit cells stacked to each other, wherein each of the plurality of units cells integrally has a unified body formed by holding a solid polymer electrolyte membrane between an anode and a cathode, and also has one of a plurality of sets of reaction gas passages adapted for allowing at least one of a fuel gas and an oxidizing gas to flow in the unit cells in parallel with respect to the stacking direction of the unit cells and in the same flow direction. The above method is characterized in that the reaction gas is supplied in parallel from reaction gas supplying communication holes into sets of reaction gas passages of the unit cells and is made to flow in the sets of reaction gas passages to be used for reaction, and the spent reaction gas is discharged into reaction gas discharging communication holes.

In the above method, two sets of coolant passages may be disposed on both sides of the plurality of unit cells in the stacking direction of the unit cells in such a manner as to hold the unit cells therebetween, and the cross-sections of a set of the reaction gas passages disposed in proximity to the coolant passages may be larger in flow rate and/or flow velocity than another set of the reaction gas passages disposed apart from the coolant passages. With this configuration, even if there occur different temperature environments in each unit cell, it is possible to improve the drainage characteristic and equalize the humidity in the unit cell, and hence to positively perform a desirable electrochemical reaction for each unit cell.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
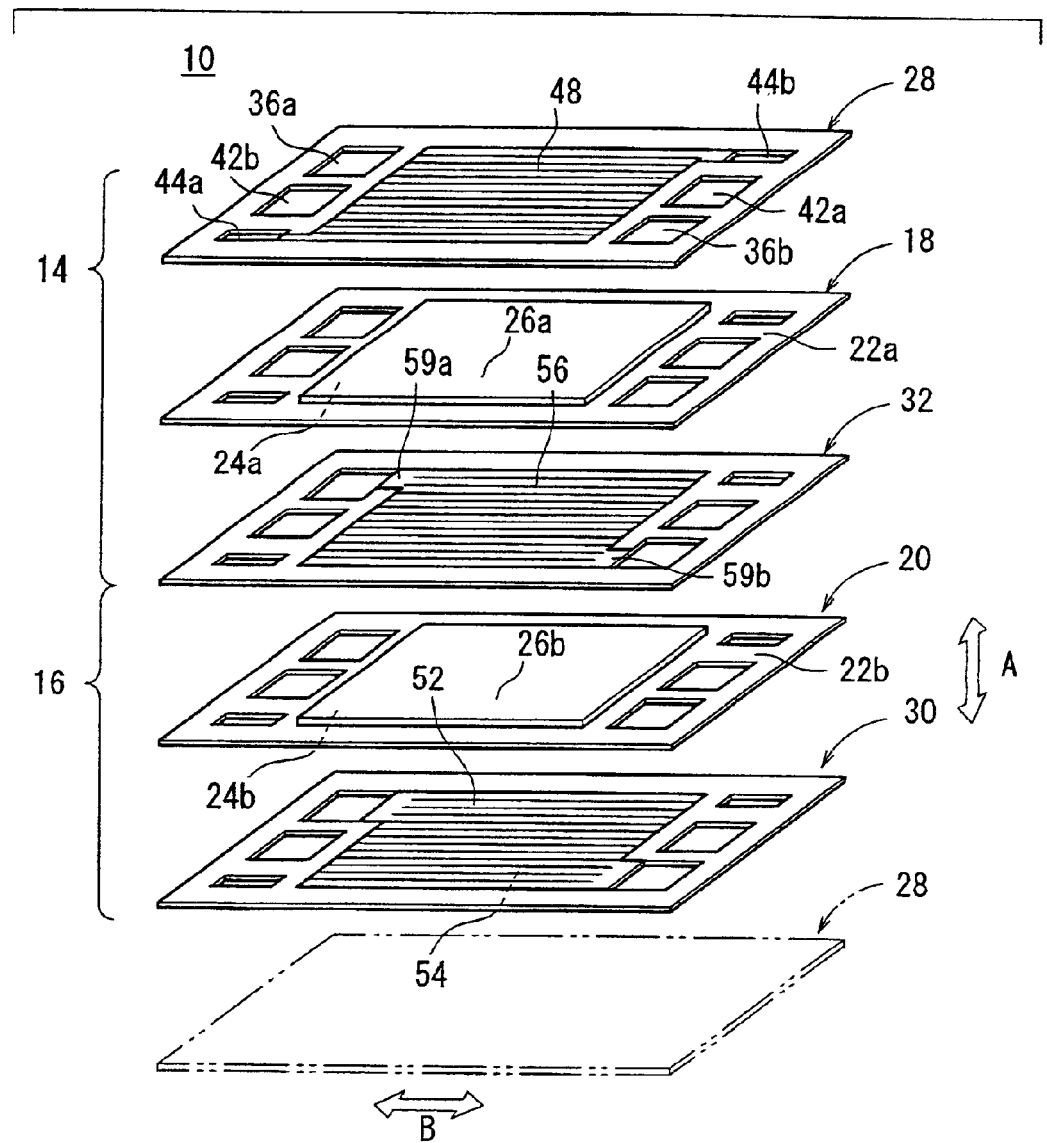
FIG. 1 is an exploded perspective view of an essential portion of a solid polymer electrolyte fuel cell assembly according to a first embodiment of the present invention.
Figure 2:
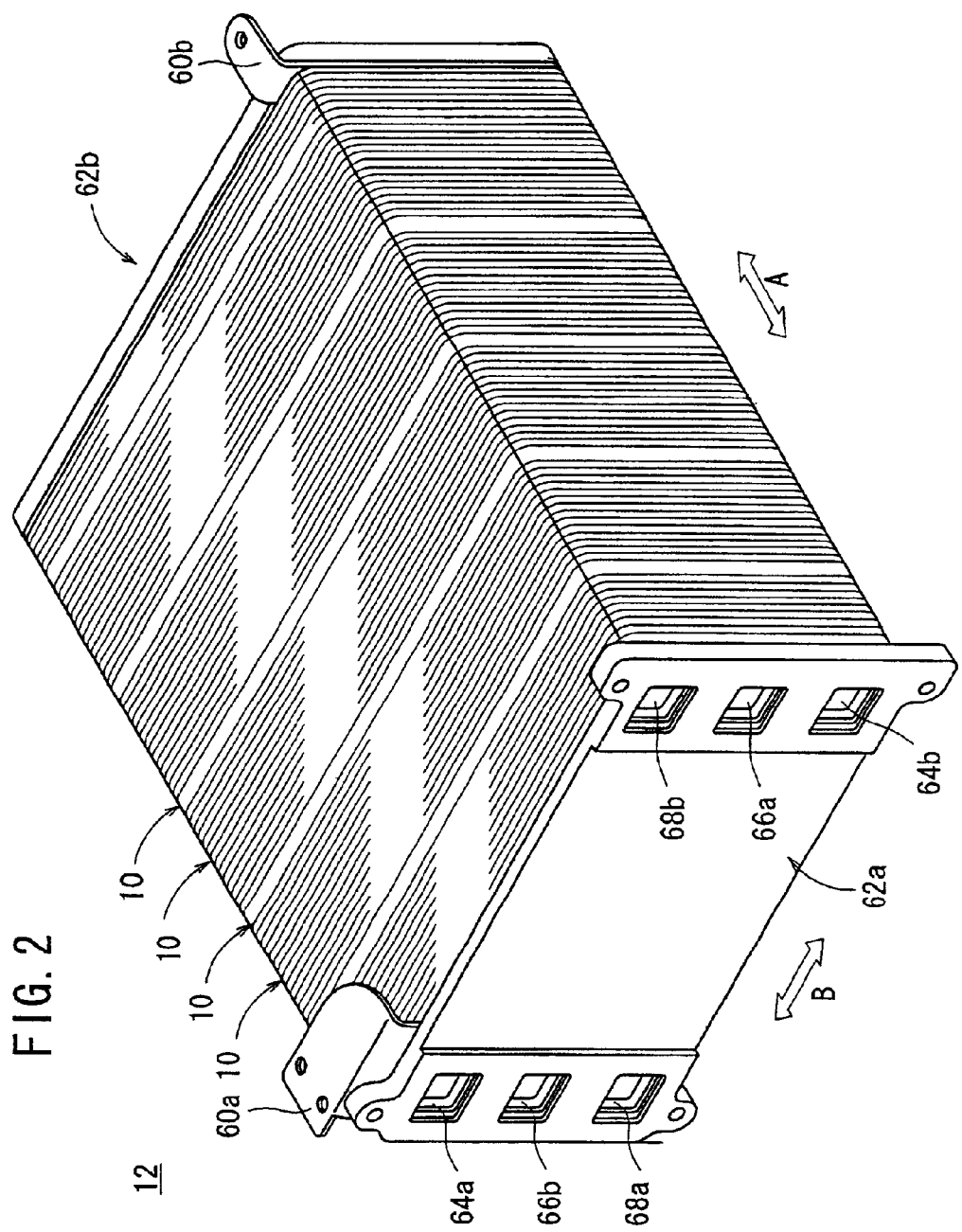
FIG. 2 is a schematic perspective view of a fuel cell stack.

FIG. 1 is an exploded perspective view of an essential portion of a solid polymer electrolyte fuel cell assembly 10 according to a first embodiment of the present invention, and FIG. 2 is a schematic perspective view of a fuel cell stack 12 obtained by stacking a plurality of sets of the cell assemblies 10 to each other.

As shown in FIG. 1, the cell assembly 10 is formed by stacking a first unit cell 14 and a second unit cell 16 to each other. The first unit cell 14 has a first unified body 18, and the second unit cell 16 has a second unified body 20.

The first unified body 18 has a solid polymer electrolyte membrane 22a, and a cathode 24a and an anode 26a which are disposed with the electrolyte membrane 22a put therebetween, and the second unified body 20 has a solid polymer electrolyte membrane 22b, and a cathode 24b and an anode 26b which are disposed with the electrolyte membrane 22b put therebetween. Each of the cathodes 24a and 24b and the anodes 26a and 26b is formed by joining a noble metal based catalyst electrode layer onto a base member mainly made from carbon, and is provided, on its surface, with a gas diffusion layer formed of a porous layer, for example, a porous carbon paper.

Figure 3:
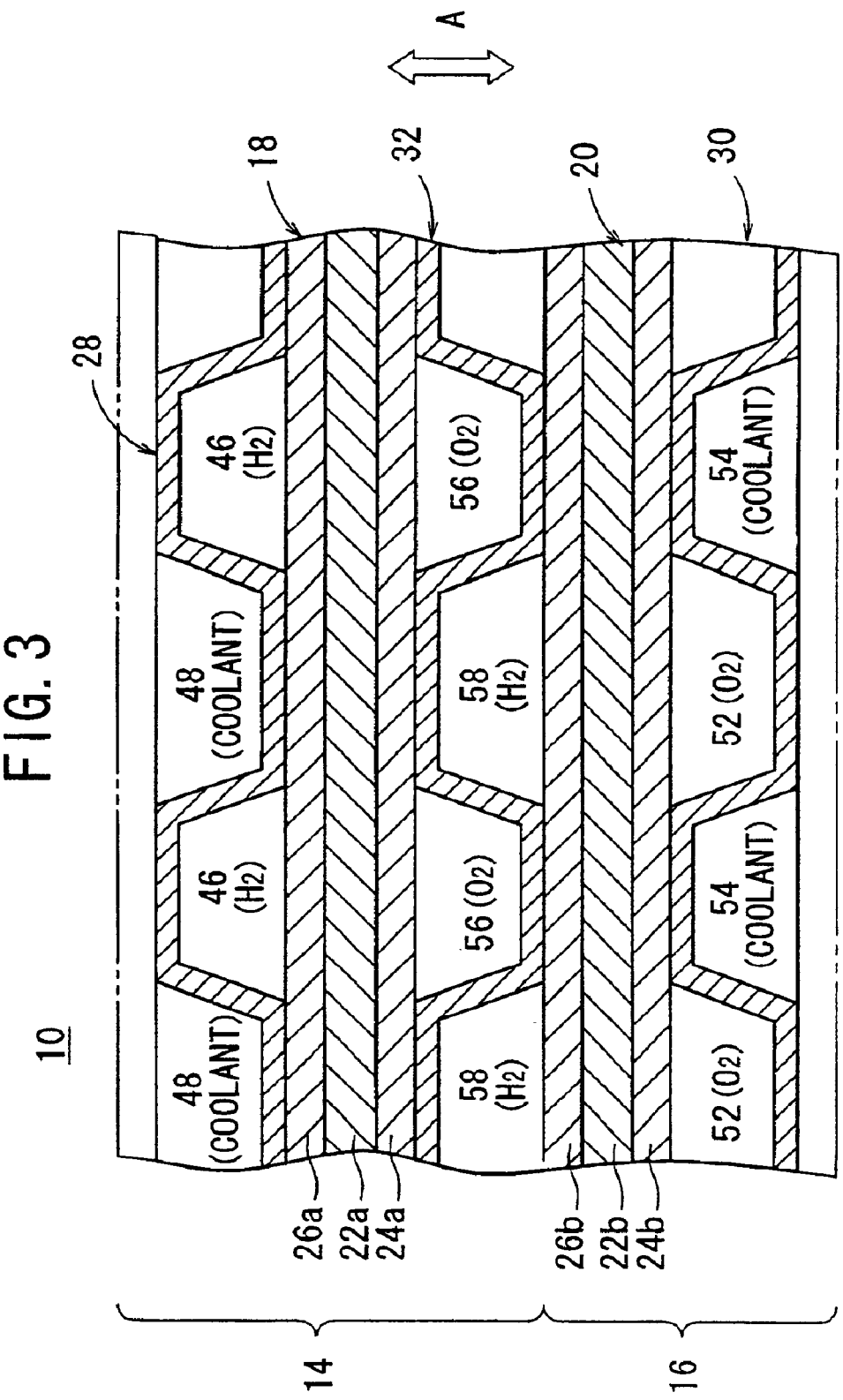
FIG. 3 is sectional view illustrating an essential portion of the cell assembly.

As shown in FIGS. 1 and 3, a first separator 28 is disposed on the anode 26a side of the first unified body 18; a second separator 30 is disposed on the cathode 24b side of the second unified body 20; and an intermediate separator 32 is disposed between the first and second unified bodies 18 and 20.

As shown in FIG. 1, each of the first and second unified bodies 18 and 20, the first and second separators 28 and 30, and the intermediate separator 32 has, at one edge in the long-side direction, an oxidizing gas inlet 36a, a fuel gas outlet 42b, and a coolant inlet 44a. The oxidizing gas inlet 36a allows an oxidizing gas (reaction gas) such as an oxygen containing gas or air to pass therethrough. The fuel gas outlet 42b allows a fuel gas (reaction gas) such as a hydrogen containing gas to pass therethrough. The coolant inlet 44a allows a coolant to pass therethrough. The oxidizing gas inlets 36a (fuel gas outlets 42b, and coolant inlets 44a) provided in the cell components 18, 20, 28, 30, and 32 are communicated to each other in the stacking direction (shown by an arrow A) of the first and second unit cells 14 and 16.

On the other hand, each of the first and second unified bodies 18 and 20, the first and second separators 28 and 30, and the intermediate separator 32 has, at the other edge in the long-side direction, a coolant outlet 44b, a fuel gas inlet 42a, and an oxidizing gas outlet 36b. The coolant outlets 44b (fuel gas inlets 42a, and oxidizing gas outlets 36b) provided in the cell components 18, 20, 28, 30, and 32 are communicated to each other in the direction A.

Figure 4:
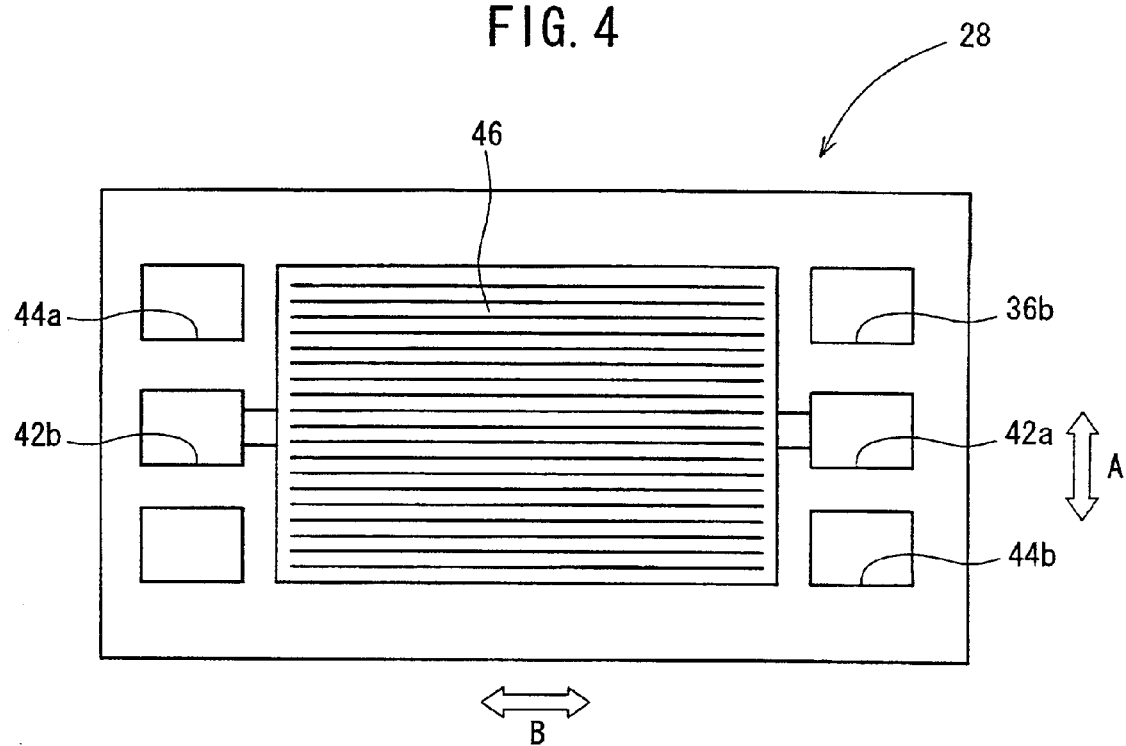
FIG. 4 is a front view of a first separator constituting part of the cell assembly.

The first separator 28 is configured as a metal sheet. A portion, facing to a reaction plane (power generation plane) of the first unified body 18, of the metal sheet is formed into a shape of projections and depressions, for example, into a corrugated shape for forming passages. To be more specific, as shown in FIGS. 3 and 4, the first separator 28 has, on the side facing to the anode 26a of the first unified body 18, a plurality of fuel gas passages (reaction gas passages) 46. The fuel gas passages 46 linearly extend in the long-side direction (shown by an arrow B). The one-ends of the fuel gas passages 46 are communicated to the fuel gas inlet 42a and the other ends thereof are communicated to the fuel gas outlet 42b.

As shown in FIGS. 1 and 3, the first separator 28 also has, on the side opposite to the side having the fuel gas passage 46, a plurality of coolant passages 48. The coolant passages 48 linearly extend in the long-side direction (shown by the arrow B). The one-ends of the coolant passages 48 are communicated to the coolant inlet 44a, and the other ends thereof are communicated to the coolant outlet 44b.

The second separator 30 is configured as being substantially similar to the first separator 28. The second separator 30 has, on the side facing to the cathode 24b of the second unified body 20, a plurality of oxidizing gas passages (reaction gas passages) 52. The oxidizing gas passages 52 linearly extend in the long-side direction (shown by the arrow B). The one-ends of the oxidizing gas passages 52 are communicated to the oxidizing gas inlet 36a and the other ends thereof are communicated to the oxidizing gas outlet 36b. The second separator 30 also has, on the side opposite to the side having the oxidizing gas passage 52, a plurality of coolant passages 54. The coolant passages 54 linearly extend in the long-side direction (shown by the arrow B). The one-ends of the coolant passages 54 are communicated to the coolant inlet 44a and the other ends thereof are communicated to the coolant outlet 44b.

The intermediate separator 32 is configured as being substantially similar to the first and second separators 28 and 30. The intermediate separator 32 has, on the side facing to the cathode 24a of the first unified body 18, a plurality of oxidizing gas passages (reaction gas passages) 56. The oxidizing gas passages 56 linearly extend in the long-side direction (shown by the arrow B). The one-ends of the oxidizing gas passages 56 are communicated to the oxidizing gas inlet 36a and the other ends thereof are communicated to the oxidizing gas outlet 36b.

The intermediate separator 32 also has, on the side facing to the anode 26b of the second unified body 20, a plurality of fuel gas passages (reaction gas passages) 58. The fuel gas passages 58 linearly extend in the long-side direction (shown by the arrow B). The one-ends of the fuel gas passages 58 are communicated to the fuel gas inlet 42a and the other ends thereof are communicated to the fuel gas outlet 42b. In addition, a portion, communicated to the oxidizing gas inlet 36a, of the one-ends of the oxidizing gas passages 56 is choked, to form a choked portion 59a, and a portion, communicated to the oxidizing gas outlet 36b, of the other ends of the oxidizing gas passages 56 is choked, to form a choked portion 59b (see FIG. 1).

A specific number of sets of the cell assemblies 10 configured as described above are, as shown in FIG. 2, are stacked to each other in the direction A by means of fixing means (not shown). End plates 62a and 62b are disposed, via current collecting electrodes 60a and 60b, on both ends of the sets of the cell assemblies 10 in the direction A, followed by fastening of the end plates 62a and 62b by means of tie rods (not shown) or the like, to obtain a fuel cell stack 12.

The end plate 62a has, at one edge in the long-side direction, an oxidizing gas supply port 64a communicated to the oxidizing gas inlets 36a, a fuel gas discharge port 66b communicated to the fuel gas outlets 42b, and a coolant supply port 68a communicated to the coolant inlets 44a. The end plate 62a also has, at the other edge in the long-side direction, a coolant discharge port 68b communicated to the coolant outlets 44b, a fuel gas supply port 66a communicated to the fuel gas inlets 42a, and an oxidizing gas discharge port 64b communicated to the oxidizing gas outlets 36b.

The operations of the fuel cell stack 12 and the cell assembly 10 configured as described above will be described below in relation to a reaction gas supply method of the present invention.

In the fuel cell stack 12, a fuel gas such as a hydrogen containing gas is supplied from the fuel gas supply port 66a, an oxidizing gas such as air or an oxygen containing gas is supplied from the oxidizing gas supply port 64a, and a coolant such as pure water, ethylene glycol, or oil is supplied from the coolant supply port 68a, so that the fuel gas, oxidizing gas, and coolant are supplied to the plurality of sets of cell assemblies 10 stacked to each other in the direction A.

Figure 5:
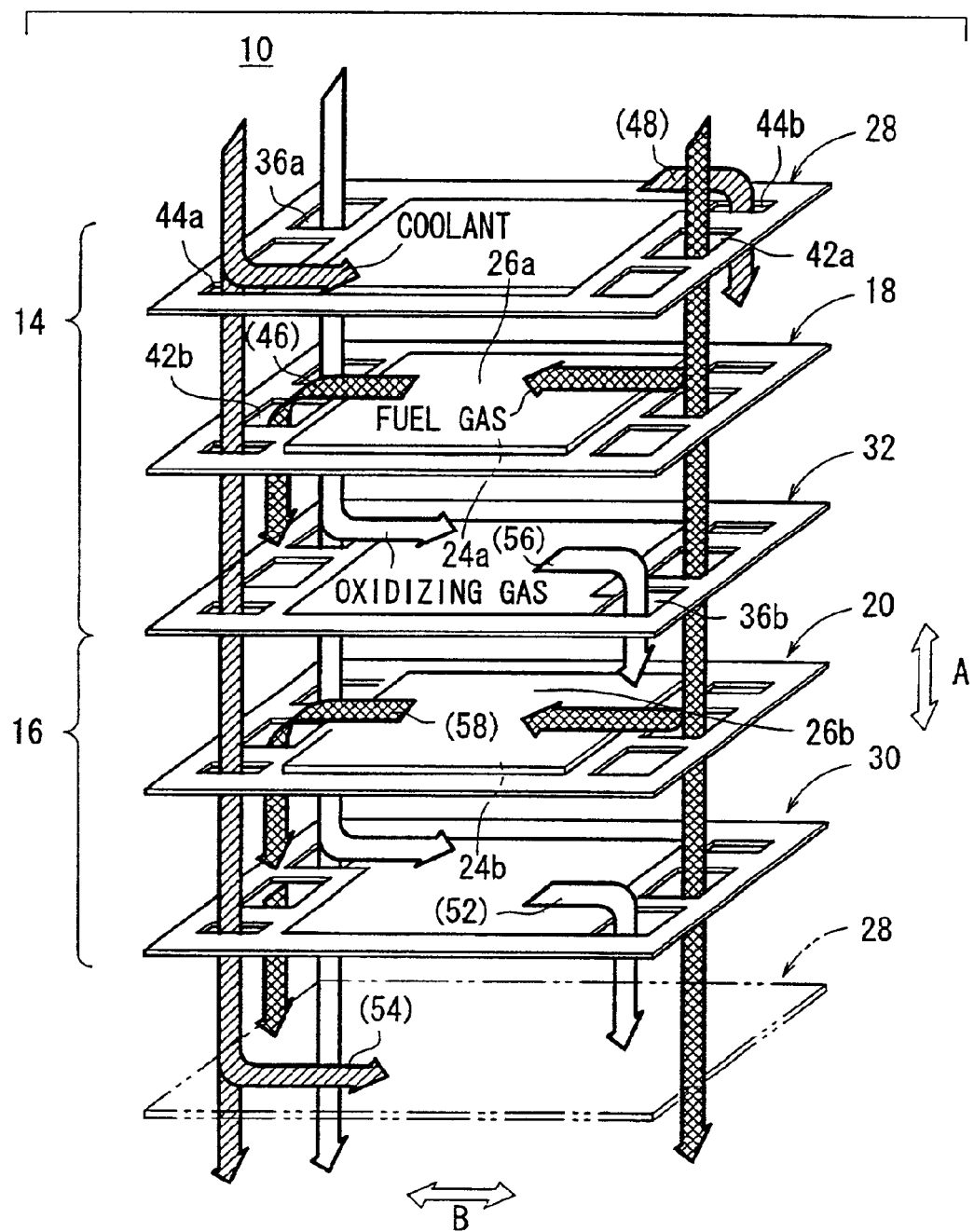
FIG. 5 is a diagram showing the flows of an oxidizing gas, a fuel gas, and a coolant.

As shown in FIG. 5, part of the oxidizing gas supplied to the oxidizing gas inlets 36a communicated to each other in the direction A is introduced in the plurality of oxidizing gas passages 56 provided in the intermediate separator 32, to move along the cathode 24a of the first unified body 18. On the other hand, part of the fuel gas supplied to the fuel gas inlets 42a communicated to each other in the direction A is introduced in the plurality of fuel gas passages 46 provided in the first separator 28, to move along the anode 26a of the first unified body 18 in the direction opposed to the flow direction of the oxidizing gas. Accordingly, in the first unified body 18, the oxidizing gas supplied to the cathode 24a and the fuel gas supplied to the anode 26a are consumed by electrochemical reaction in the catalyst layers of the electrodes, to result in power generation.

Another part of the oxidizing gas supplied to the oxidizing gas inlets 36a is introduced in the plurality of oxidizing gas passages 52 formed in the second separator 30, to move along the cathode 24b of the second unified body 20, whereas another part of the fuel gas supplied to the fuel gas inlets 42a is introduced in the plurality of fuel gas passages 58 provided in the intermediate separator 32, to move along the anode 26b of the second unified body 20. As a result, there occurs power generation in the second unified body 20.

On the other hand, part of the coolant supplied to the coolant inlets 44a communicated to each other in the direction A flows in the coolant passages 48 formed in the first separator 28, to be discharged from the coolant outlet 44b of the first separator 28, whereas another part of the coolant supplied to the coolant inlets 44a flows in the coolant passages 54 formed in the second separator 30, to be discharged from the coolant outlet 44b of the second separator 30.

According to the first embodiment configured as described above, since the cell assembly 10 is composed of a plurality (for example, two) of the unit cells 14 and 16 integrated to each other, the fuel cell stack 12 can be assembled with each cell assembly 10 taken as a handling unit. Accordingly, at the time of assembly of the fuel cell stack 12, works of handling the components of the fuel cell stack 12 can be effectively improved as compared with works of handing the components of a conventional fuel cell stack which is assembled with each of the unit cells 14 and 16 taken as a handling unit.

According to the first embodiment, the cell assembly 10 has a so-called thinned-out cooling structure in which the coolant passages 48 and 54 are provided in such a manner as to hold the first and second unit cells 14 and 16 therebetween, that is, no coolant passages are provided between the first and second unified bodies 18 and 20. Accordingly, as compared with a cooling structure in which coolant passages are provided for each of the unit cells 14 and 16, the cooling structure in this embodiment can be effectively simplified, to thereby obtain an effect of easily reducing the size and weight of the whole cell assembly 10.

The above-described cooling structure of the cell assembly 10 will be more fully described below. The coolant passages 54 are disposed in proximity to the oxidizing gas passages 52 of the second separator 30, whereas the coolant passages 48 are disposed apart from the oxidizing gas passages 56 of the intermediate separator 32. Accordingly, the oxidizing gas passages 52 of the second separator 30 are cooled by the coolant to become a low temperature side, whereas the oxidizing gas passages 56 of the intermediate separator 32 are less cooled to become a high temperature side, so that there occurs a difference in temperature environment between the first and second unit cells 14 and 16. This may causes an inconvenience that water is produced in the oxidizing gas passages 52 of the second separator 30 on the low temperature side and is accumulated in the passages, gas diffusion layer, or catalyst layer, tending to block the oxidizing gas passages 52.

According to this embodiment, to cope with such an inconvenience, there is adopted a structure for equalizing the humidity in the second unit cell 16 to that in the first unit cell 14 by increasing the flow rate of the oxidizing gas flowing in the oxidizing gas passages 52 of the second separator 30 and improving the drainage characteristic of the water produced in the oxidizing gas passages 52 by increasing the flow velocity of the oxidizing gas flowing in the oxidizing gas passages 52. To be more specific, since choked portions 59a and 59b are respectively provided at the portions communicated to the oxidizing gas inlet 36a and the oxidizing gas outlet 36b of the oxidizing gas passages 56 provided in the intermediate separator 32 on the high temperature side, the flow rate of the oxidizing gas in the oxidizing gas passages 52 of the second separator 30 becomes larger than that in the oxidizing gas passages 56 of the intermediate separator 32.

As a result, according to the first embodiment, it is possible to positively discharge the water produced in the oxidizing gas passages 52 of the second separator 30 on the low temperature side, and hence to equalize the humidity in the second unit cell 16 to that in the first unit cell 14. This is effective to equalize the current density distribution in the second unit cell 16 to that in the first unit cell 14 and hence to reduce a concentration overpotential. Further, since the flow rate and flow velocity of the oxidizing gas flowing in the intermediate separator 32 on the high temperature side are reduced, it is possible to prevent drying of the first unified body 18.

According to the first embodiment, the cross-sections of the oxidizing gas passages 52 can be set to be different from those of the oxidizing gas passages 56. For example, the cross-sections of the passages can be altered by changing the depths or widths or the number of the passages. With this configuration, the flow velocity of the oxidizing gas in the oxidizing gas passages 52 can be made higher than that of the oxidizing gas in the oxidizing gas passages 56.

Figure 6:
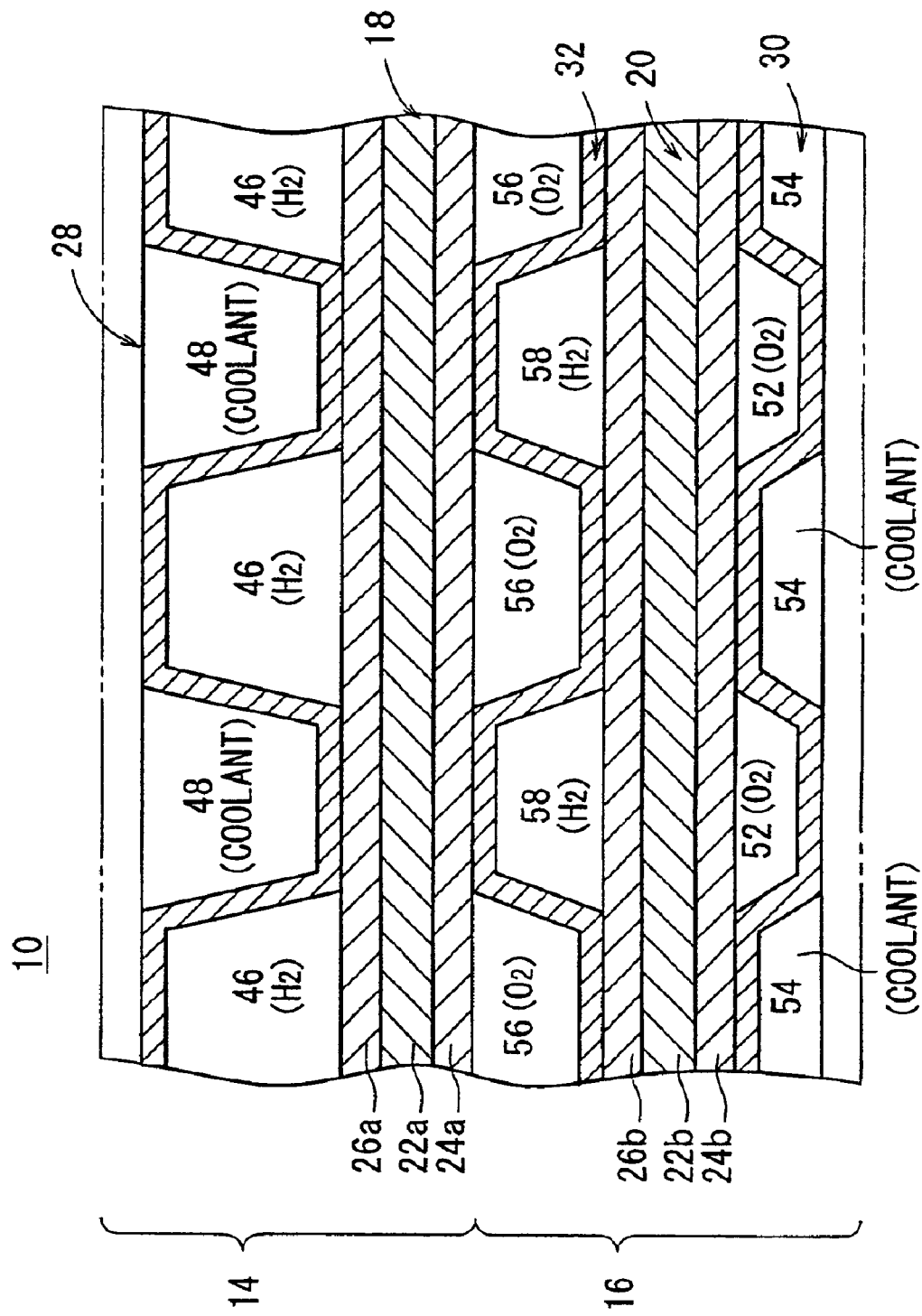
FIG. 6 is a view illustrating a method of making the cross-sections of a set of oxidizing gas passages different from those of another set of oxidizing gas passages.

To be more specific, the flow velocity of the oxidizing gas in the oxidizing gas passages 52 are made higher than that of the oxidizing gas in the oxidizing gas passages 52 by setting the cross-sections of the oxidizing gas passages 52 to be smaller than those of the oxidizing gas passages 56 as shown in FIG. 6. With this configuration, it is possible to effectively improve the drainage characteristic of water liable to be produced in a large amount in the oxidizing gas passages 52 on the low temperature side.

Figure 7:
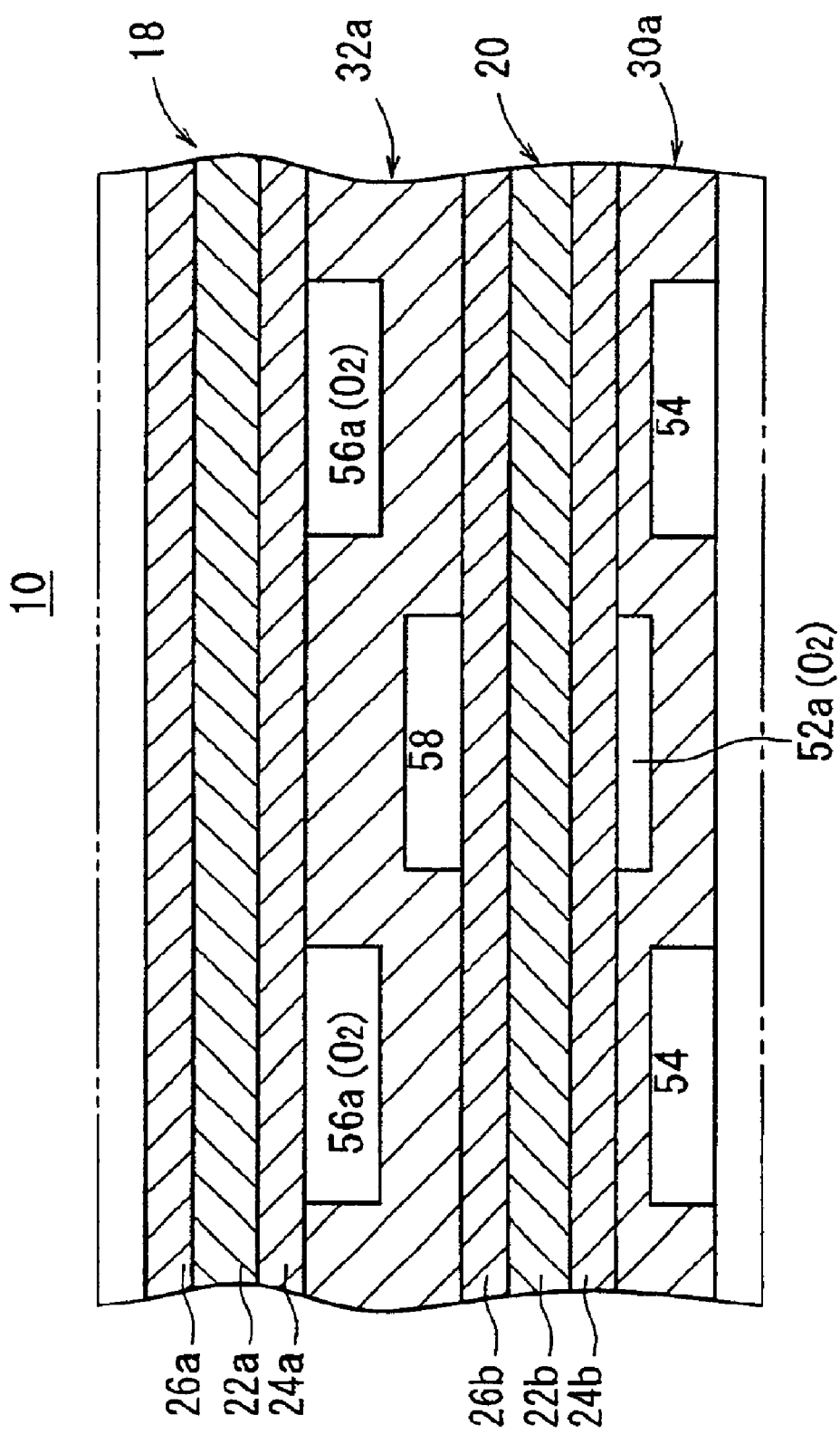
FIG. 7 is a view illustrating a method of making the cross-sections of a set of oxidizing gas passages different from those of another set of oxidizing gas passages by making the depths of the former oxidizing gas passages different from those of the latter oxidizing gas passages.

As shown in FIG. 7, the depth of each of oxidizing gas passages 52a provided in a plate-like second separator 30a may be set to be smaller than that of each of oxidizing gas passages 56a provided in a plate-like intermediate separator 32a. Further, it is possible to make the first and second unit cells 14 and 16 thin, and hence to easily miniaturize the whole cell assembly 10.

Figure 8:
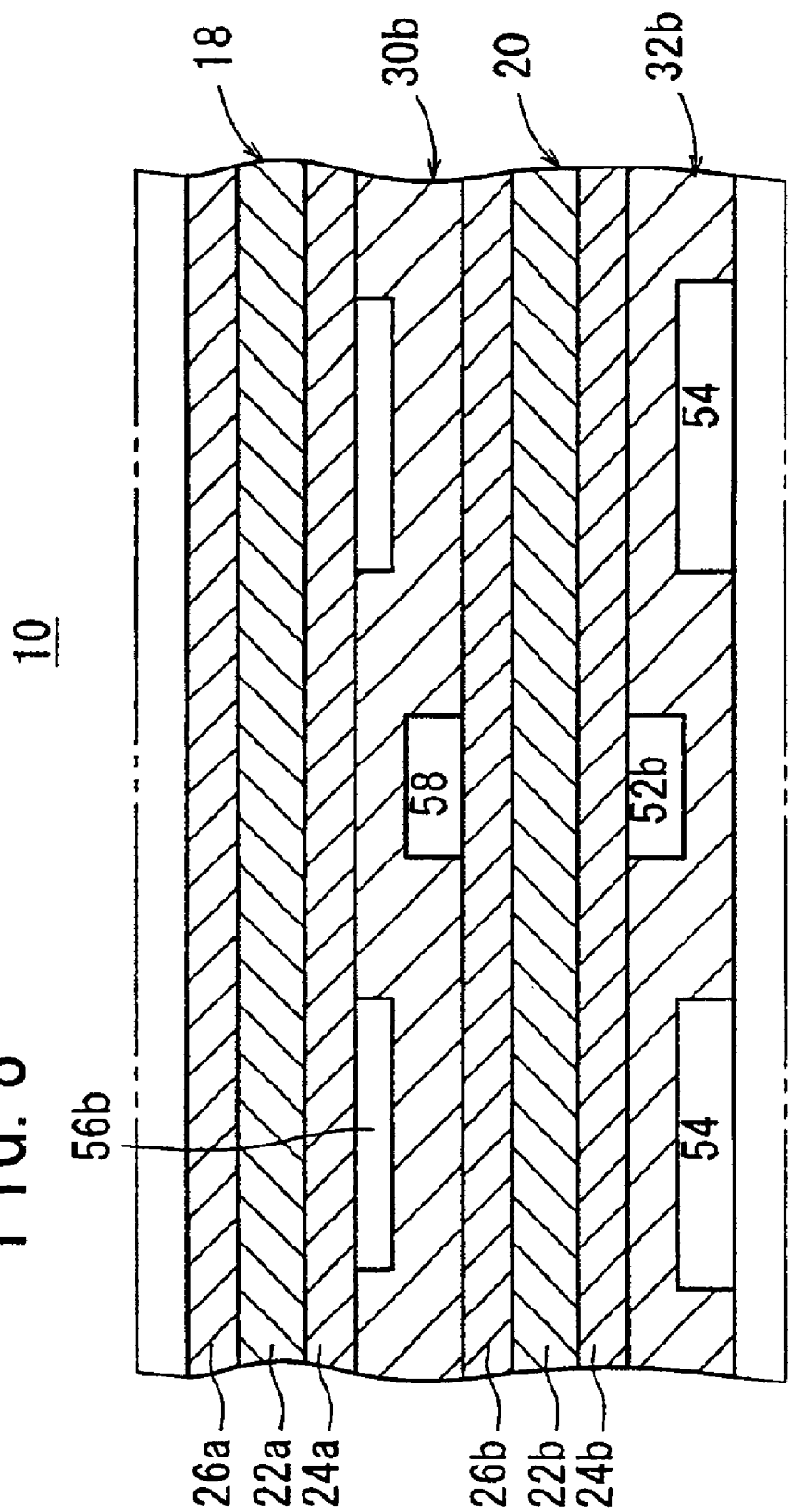
FIG. 8 is a view illustrating a method of making the cross-sections of a set of oxidizing gas passages different from those of another set of oxidizing gas passages by making the widths of the former oxidizing gas passages different from those of the latter oxidizing gas passages.

As shown in FIG. 8, the width of each of oxidizing gas passages 52b provided in a plate-like second separator 30b may be set to be smaller than that of each of oxidizing gas passages 56b provided in a plate-like intermediate separator 32b. Further, it is possible to increase the contact area between the first and second unit cells 14 and 16, and hence to reduce the contact resistance.

Figure 9:
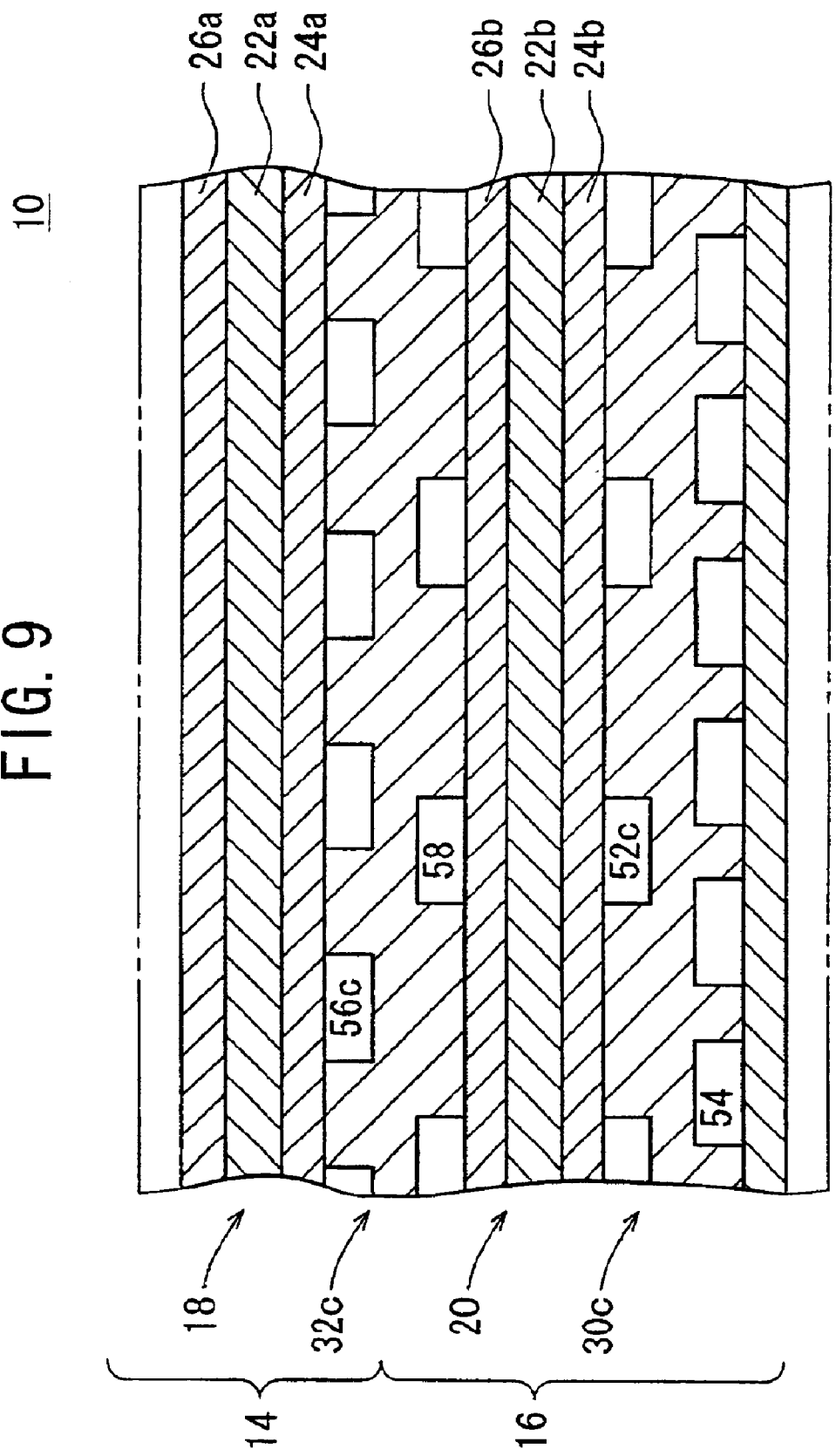
FIG. 9 is a view illustrating a method of making the cross-sections of a set of oxidizing gas passages different from those of another set of oxidizing gas passages by making the number of the former oxidizing gas passages different from that of the latter oxidizing gas passages.

As shown in FIG. 9, the number of oxidizing gas passages 52c provided in a plate-like second separator 30c may be set to be smaller than that of oxidizing gas passages 56c provided in a plate-like intermediate separator 32c. Further, like the example shown in FIG. 8, it is possible to effectively increase the contact area between the first and second unit cells 14 and 16.

According to the first embodiment, the whole size of the fuel cell stack 12 can be easily reduced by miniaturizing each cell assembly 10. The miniaturization of the cell assembly 10 is achieved as follows. Firstly, since each of the first and second separators 28 and 30 and the intermediate separator 32 is configured as the metal sheet formed into a corrugated shape (having projections and depressions), the separators can be thinned, with a result that the whole cell assembly 10 can be thinned.

Secondly, since the intermediate separator 32 has, on the side facing to the first unified body 18, the oxidizing gas passages 56 and also has, on the side facing to the second unified body 20, the fuel gas passages 58 (see FIG. 3), the structure of the intermediate separator 32 is thinner than a separator structure in which the oxidizing gas passages 56 and the fuel gas passages 58 are individually provided in two separators. As a result, it is possible to miniaturize the whole cell assembly 10.

Thirdly, each of the first and second separators 28 and 30 and the intermediate separator 32 has the oxidizing gas inlet 36a, the oxidizing gas outlet 36b, the fuel gas inlet 42a, and the fuel gas outlet 42b, wherein the oxidizing gas inlets 36a (oxidizing gas outlets 36b, fuel gas inlets 42a, and fuel gas outlets 42b) provided in the separators 28, 30 and 32 are communicated to each other in the stacking direction of the first and second unit cells 14 and 16, and accordingly, it is possible to eliminate the need of provision of a separate manifold (external manifold) outside the cell assembly 10 and also eliminate the need of provision of a seal structure used for the external manifold, and hence to miniaturize the cell assembly 10 and simplify the configuration of the cell assembly 10.

Figure 10:
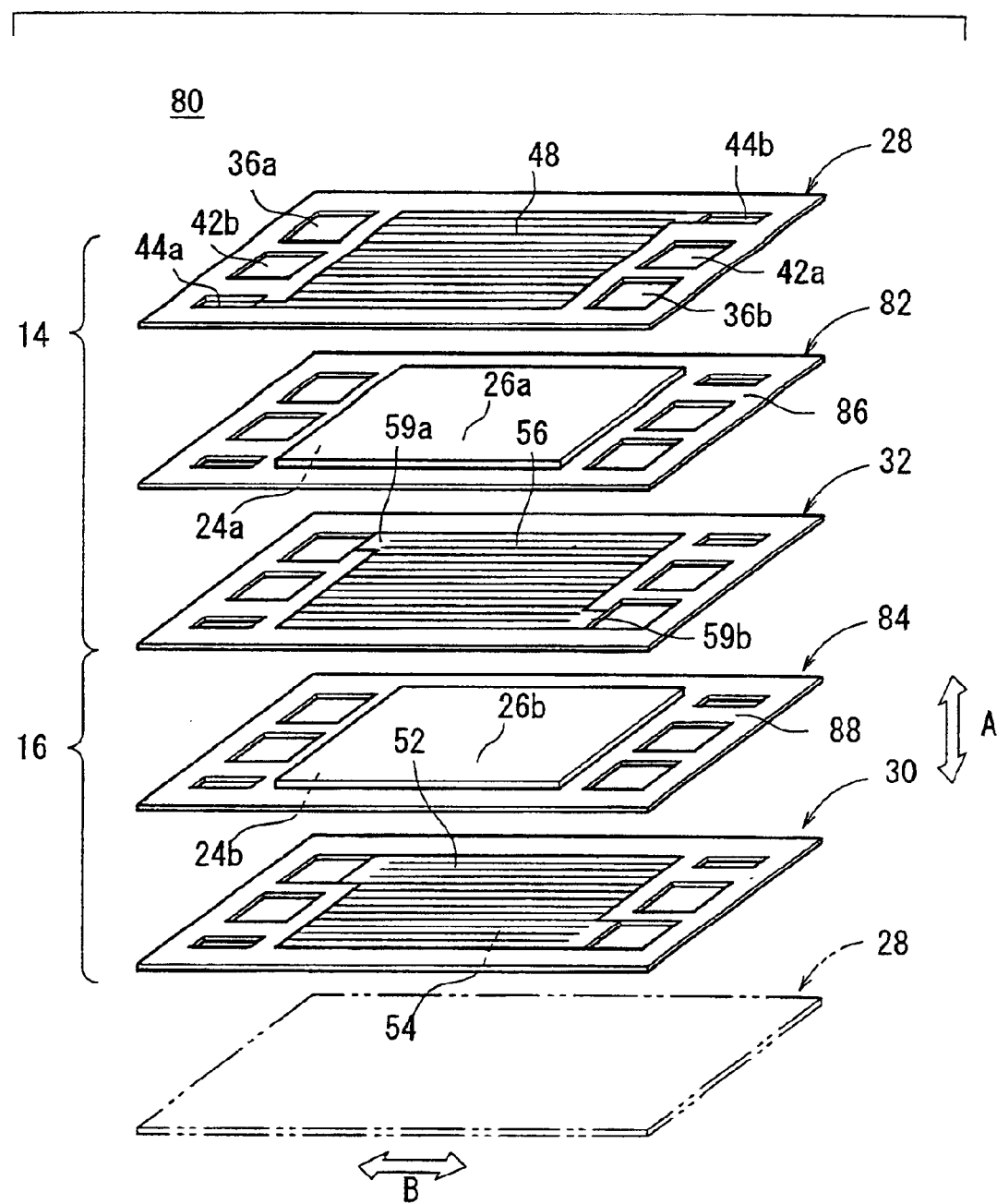
FIG. 10 is an exploded perspective view of an essential portion of a solid polymer electrolyte fuel cell assembly according to a second embodiment of the present invention.

FIG. 10 is an exploded perspective view of an essential portion of a cell assembly 80 according to a second embodiment of the present invention. In the cell assembly 80 according to this embodiment, parts corresponding to those in the cell assembly 10 according to the first embodiment are designated by the same reference numerals and the overlapping description thereof is omitted. The same is true for the following third and later embodiments.

The cell assembly 80 includes a first unified body 82 and a second unified body 84. The first unified body 82 has a hydrocarbon based electrolyte membrane 86, and the second unified body 84 has a fluorine based electrolyte membrane 88.

According to the second embodiment configured as described above, to cope with an inconvenience that the temperature of the first unified body 82 becomes higher than that of the second unified body 84 because of adoption of the thinned-out cooling structure, the hydrocarbon based electrolyte membrane 86 having a high heat resistance is provided in the first unified body 82, to thereby improve the useful life of the first unified body 82. As a result, since the first unified body 82 can be used for a long period of time, it is possible to enhance the economical merit of the cell assembly 80.

Figure 11:
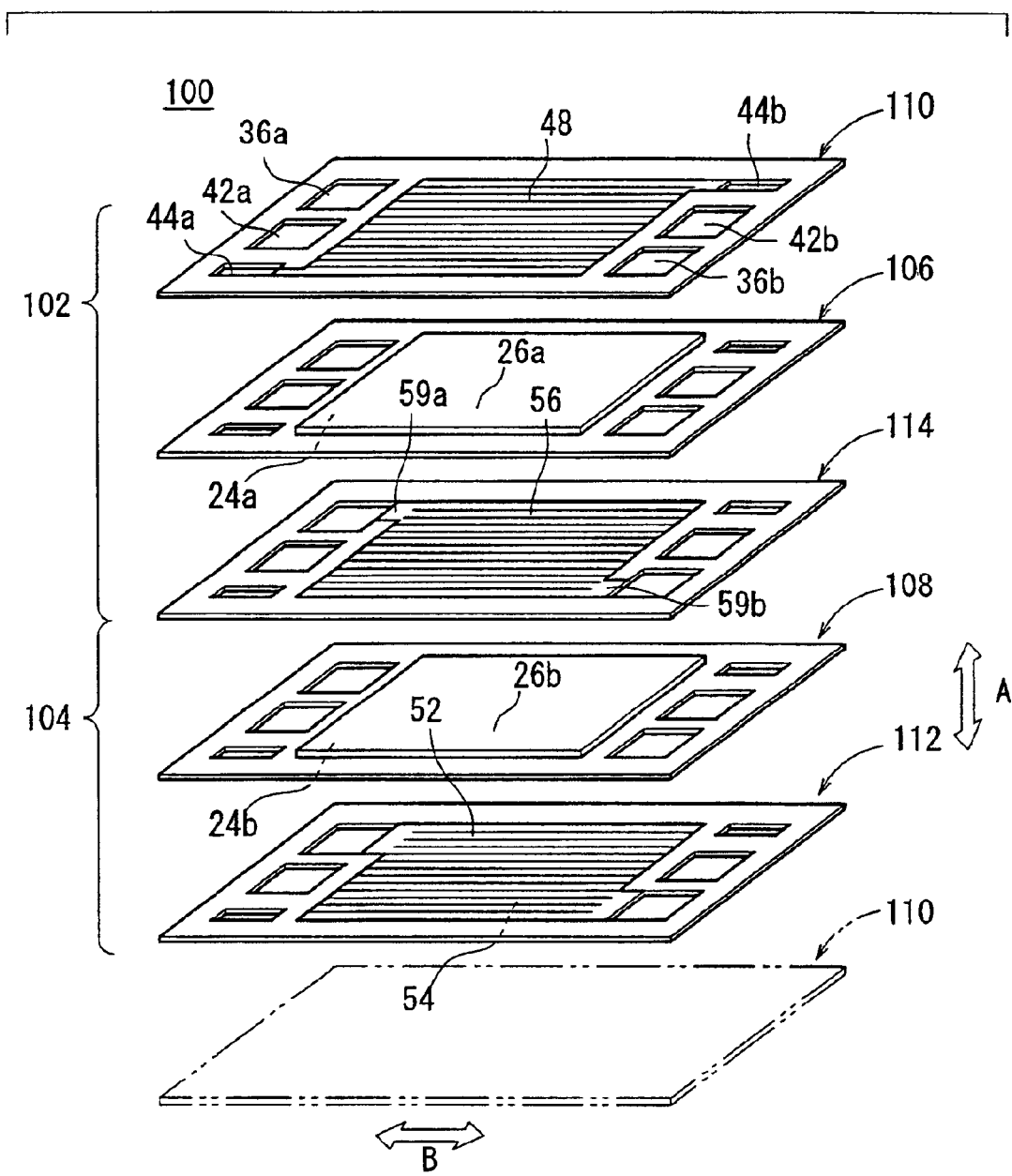
FIG. 11 is an exploded perspective view of an essential portion of a solid polymer electrolyte fuel cell assembly according to a third embodiment of the present invention.

FIG. 11 is an exploded perspective view of an essential portion of a solid polymer electrolyte fuel cell assembly 100 according to a third embodiment of the present invention.

The cell assembly 100 is formed by stacking a first unit cell 102 and a second unit cell 104 to each other in the direction A. The first unit cell 102 has a first unified body 106, and the second unit cell 104 has a second unified body 108. The first unified body 106 is held between a first separator 110 and an intermediate separator 114, and the second unified body 108 is held between the intermediate separator 114 and a second separator 112.

Each of the first and second unit cells 102 and 104 has, on the one edge side in the long-side direction, oxidizing gas inlets 36a, fuel gas inlets 42a, and coolant inlets 44a, wherein the oxidizing gas inlets 36a (fuel gas inlets 42a, and coolant inlets 44a) are communicated to each other in the direction A, and also has, on the other edge side in the long-side direction, oxidizing gas outlets 36b, fuel gas outlets 42b, and coolant outlets 44b, wherein the oxidizing gas outlets 36b (fuel gas outlets 42b, and coolant outlets 44b) are communicated to each other in the direction A.

Figure 12:
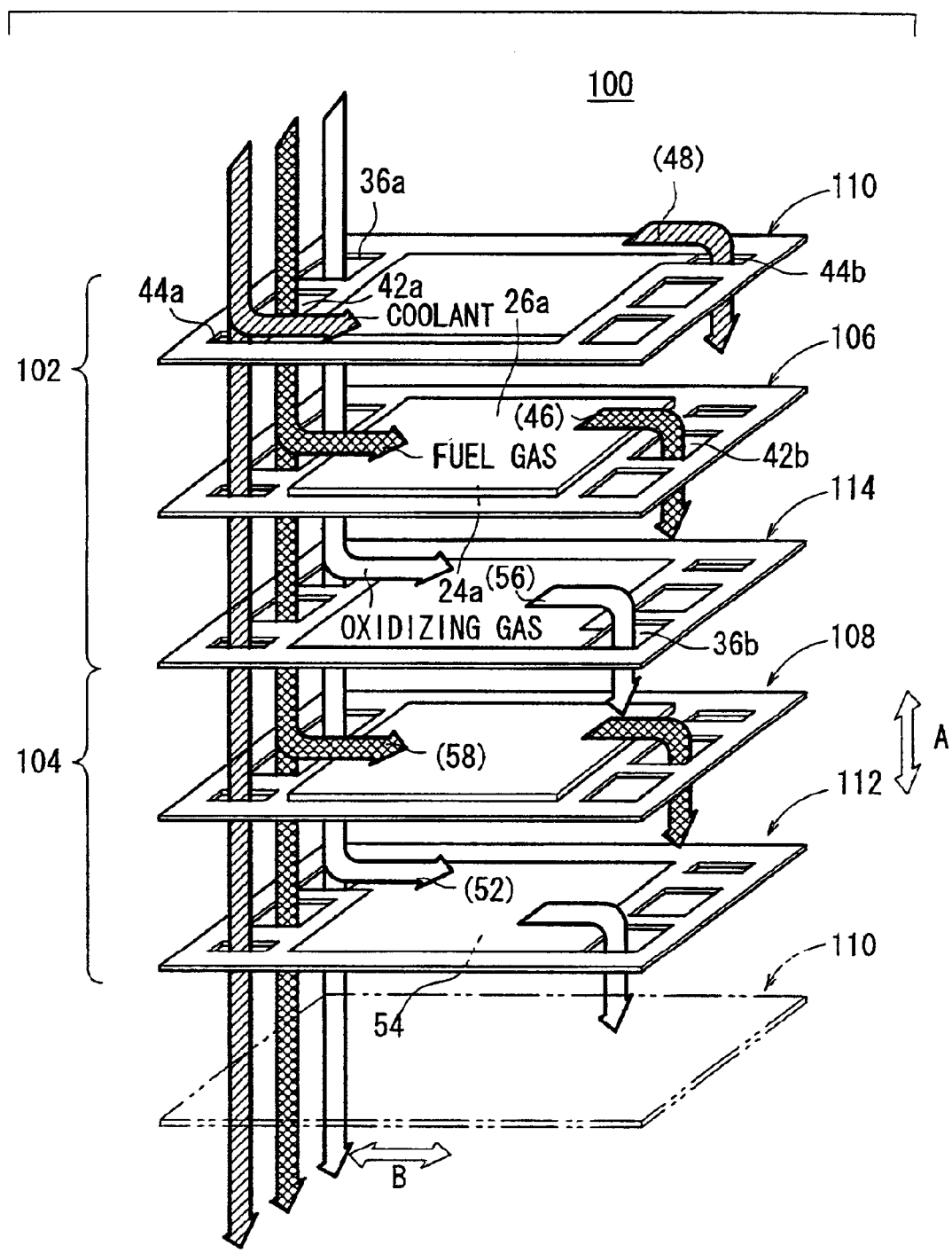
FIG. 12 is a diagram showing the flows of an oxidizing gas, a fuel gas, and a coolant in the cell assembly according to the third embodiment.

According to the cell assembly 100 configured as described above, as shown in FIG. 12, an oxidizing gas, a fuel gas, and a coolant flow in the direction A on the one-edge side in the long-side direction of the cell assembly 100. The oxidizing gas and the fuel gas are supplied in the same direction along both surfaces of each of the first and second unified bodies 106 and 108, and after used for reaction, the oxidizing gas and fuel gas are discharged from the other edge side in the long-side direction of the cell assembly 100, to flow in the direction A. Accordingly, since the oxidizing gas and the fuel gas flow in the same direction, it is possible to effectively improve the drainage characteristic of produced water.

Figure 13:
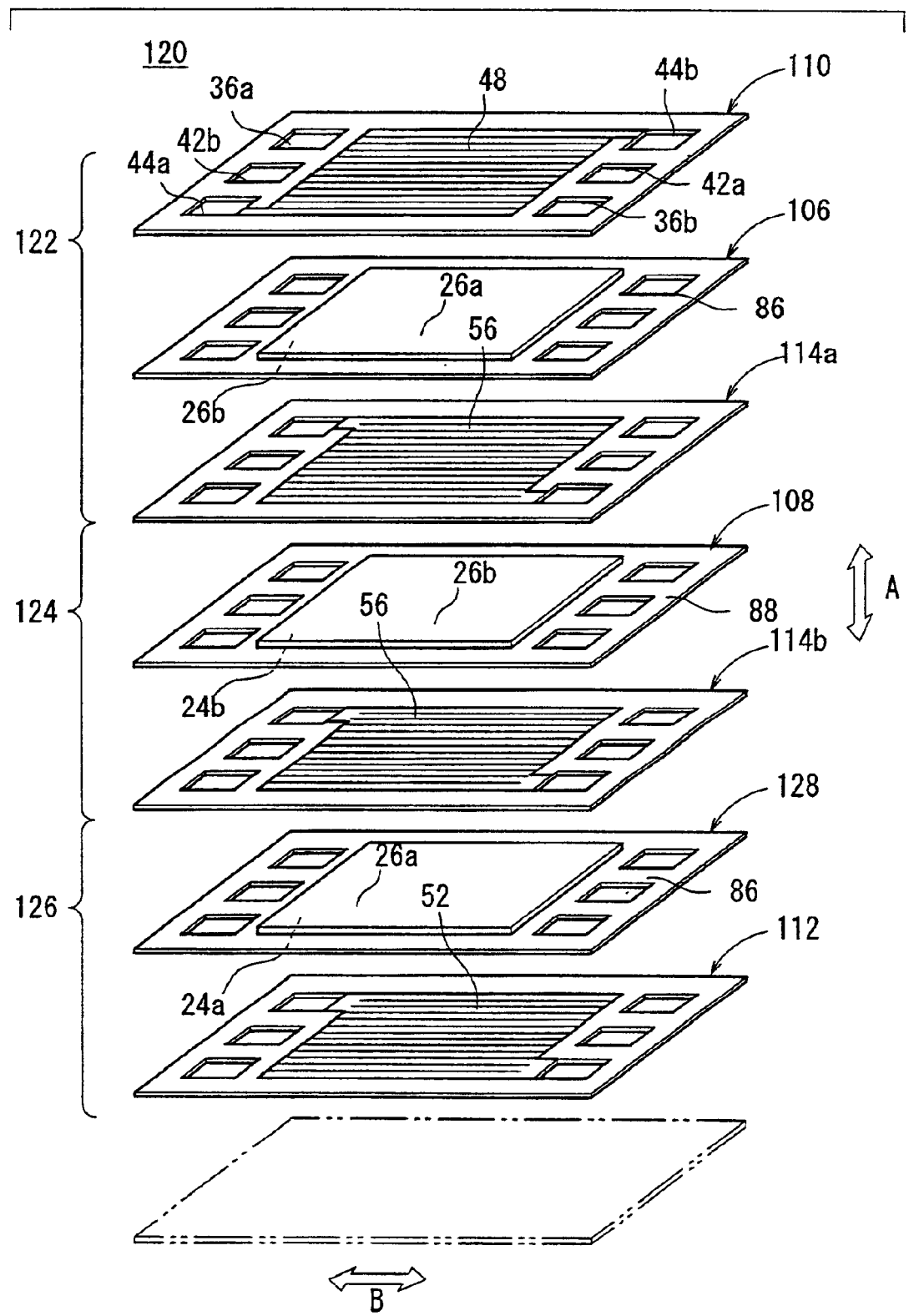
FIG. 13 is an exploded perspective view of a solid polymer electrolyte fuel cell assembly according to a fourth embodiment of the present invention.

FIG. 13 is an exploded perspective view of an essential portion of a solid polymer electrolyte fuel cell assembly 120 according to a fourth embodiment of the present invention.

The cell assembly 120 is formed by stacking a first unit cell 122, a second unit cell 124, and a third unit cell 126 to each other in the direction A. The first unit cell 122 has a first unified body 106; the second unit cell 124 has a second unified body 108; and the third unit cell 126 has a third unified body 128. The first unified body 106 is held between a first separator 110 and a first intermediate separator 114a; the second unified body 108 is held between the first intermediate separator 114a and a second intermediate separator 114b; and the third unified body 128 is held between the second intermediate separator 114b and a second separator 112.

In the cell assembly 120, there occur differences in temperature environment among the first, second and third unit cells 122, 124 and 126. In particular, the temperature of the second unified body 108 tends to be higher than that of each of the first and third unified bodies 106 and 128.

To cope with such an inconvenience, according to this embodiment, each of the first and third unified bodies 106 and 128 kept at a relatively low temperature includes a fluorine based electrolyte membrane 86 stable in a low temperature range, and the second unified body 108 kept at a relatively high temperature includes a hydrocarbon based electrolyte membrane 88 withstanding a high temperature. Further, since each of the first and third unified bodies 106 and 128 becomes high in humidity, it includes a catalyst layer and a gas diffusion layer each of which is excellent in drainage characteristic, whereas since the second unified body 108 becomes low in humidity, it includes a self-humidifying membrane and a gas diffusion layer having a high water-retention property.

The cell assembly 120 configured as described above has an effect of improving the performances of cells so as to keep up with different temperature environments by using different kinds of the first, second, and third unified bodies 106, 108, and 128.

Figure 14:
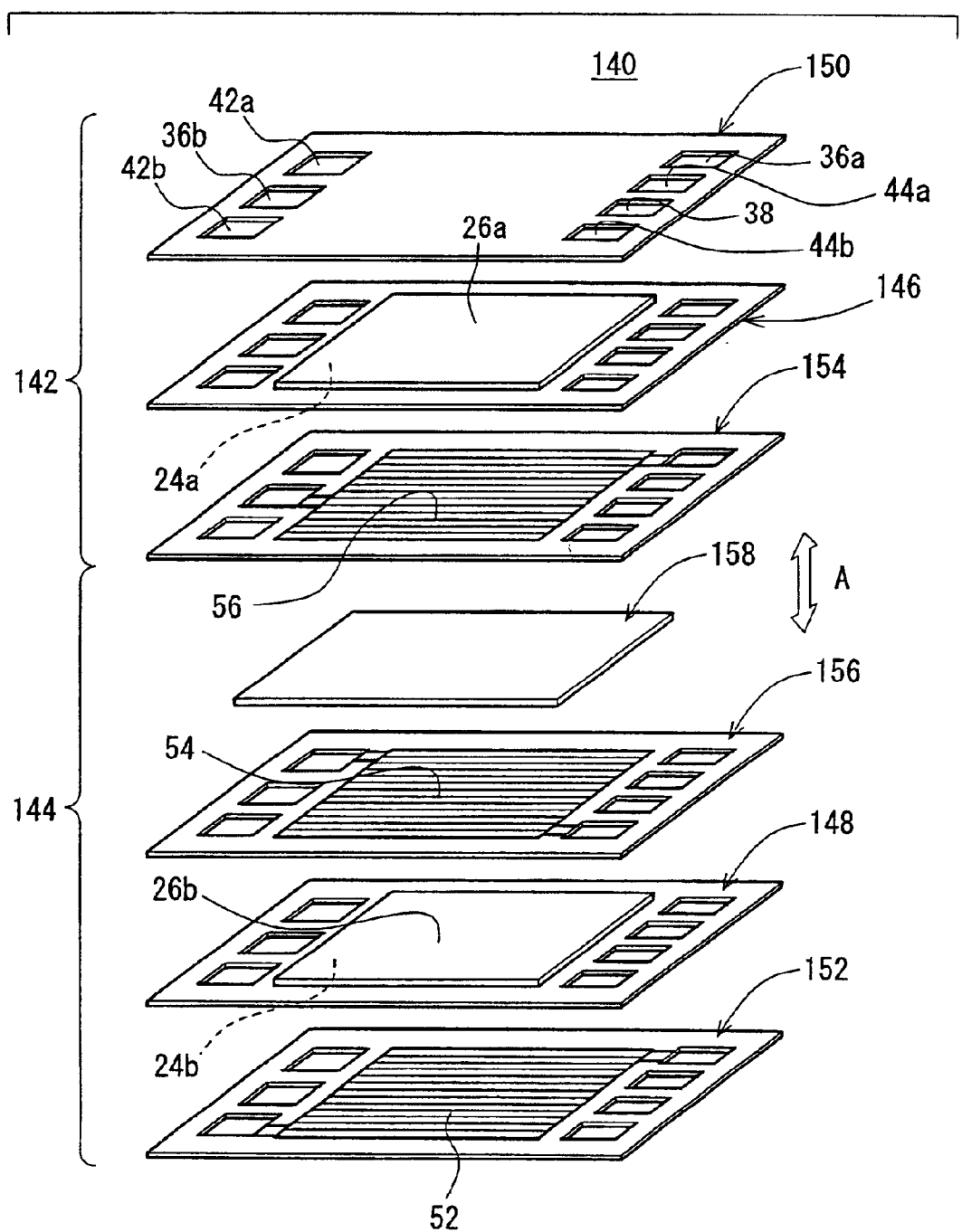
FIG. 14 is an exploded perspective view of a solid polymer electrolyte fuel cell assembly according to a fifth embodiment of the present invention.

FIG. 14 is an exploded perspective view of an essential portion of a solid polymer electrolyte fuel cell assembly 140 according to a fifth embodiment of the present invention.

The cell assembly 140 is configured by stacking a first unit cell 142 and a second unit cell 144 to each other. The first unit cell 142 has a first unified body 146, and the second unit cell 144 has a second unified body 148. The first unified body 146 is held between a first separator 150 and a first intermediate separator 154, and the second unified body 148 is held between a second intermediate separator 156 and a second separator 152. A flat baffle plate 158 is interposed between the first and second intermediate separators 154 and 156.

The cell assembly 140 has, on the one edge side in the long-side direction, fuel gas inlets 42a, oxidizing gas outlets 36b, and fuel gas outlets 42b, wherein the fuel gas inlets 42a (oxidizing gas outlets 36b, and fuel gas outlets 42b) are communicated to each other in the direction A, and also has, on the other edge side in the long-side direction, oxidizing gas inlets 36a, coolant inlets 44a, fuel gas intermediate communication holes 38, and coolant outlets 44b, wherein the oxidizing gas inlets 36a (coolant inlets 44a, fuel gas intermediate communication holes 38, and coolant outlets 44b) are communicated to each other in the direction A.

Each of the first and second intermediate separators 154 and 156 has, in a surface facing to the baffle plate 158, coolant passages 54 which extend linearly. The one-ends of the coolant passages 54 formed in the first intermediate separator 154 are communicated to the coolant inlet 44a of the first intermediate separator 154 and the other ends thereof are returned on the baffle plate 158 and are communicated to the coolant passages 54 formed in the second intermediate separator 156. The coolant passages 54 formed in the second intermediate separator 156 are communicated to the coolant outlet 44b of the second intermediate separator 156.

Figure 15:
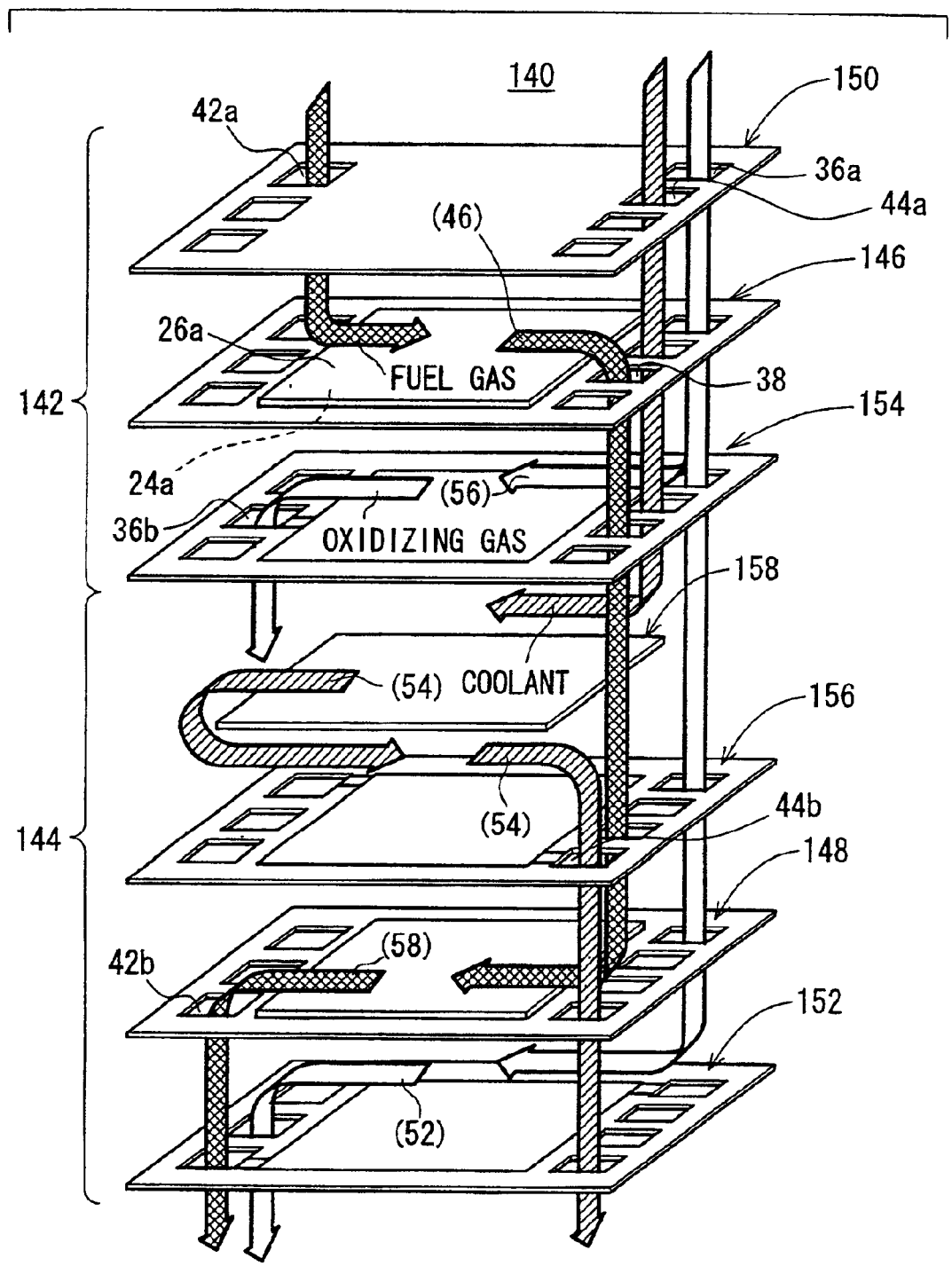
FIG. 15 is a diagram showing the flows of an oxidizing gas, a fuel gas, and a coolant in the cell assembly according to the fifth embodiment.

In the cell assembly configured as described above, the coolant is supplied to the first and second unit cells 142 and 144 in series along the flow direction shown in FIG. 15; the fuel gas flows in series from the fuel gas passages 46 formed in the first unit cell 142 to the fuel gas passages 58 formed in the second unit cell 144; and the oxidizing gas flows to the first and second unit cells 142 and 144 individually, that is, in parallel via the oxidizing gas passages 56 and 52.

According to this embodiment, since the fuel gas having a low viscosity flows in the fuel gas passages 46 and 58 communicated in series to each other, the length of the flow passages becomes longer, to thereby give a sufficiently high pressure drop to the fuel gas, with a result that it is possible to effectively discharge water produced on the anodes 26a and 26b.

Although certain preferred embodiments of the present invention have been shown and described in detail, it should be understood that various changes and modifications may be made therein without departing from the scope of the appended claims.

What is claimed is:

1. A solid polymer electrolyte fuel cell assembly, comprising a plurality of unit cells stacked to each other, said unit cells each having a unified body including an anode, a cathode, and a solid polymer electrolyte membrane disposed between said anode and said cathode, wherein a plurality of reaction gas passages are formed parallel in said cell assembly, in a direction in which said unit cells are stacked, for allowing at least one of a fuel gas and an oxidizing gas to flow through said unit cells in a same direction, wherein coolant passages for cooling said cell assembly are formed on both sides of said plurality of unit cells in the stacking direction of said unit cells, wherein each of said coolant passages extends linearly alone a plane direction of said unit cells, and wherein the coolant and the oxidizing gas flow in a same direction.

2. A solid polymer electrolyte fuel cell assembly according to claim 1, wherein a separator is interposed between adjacent two of said unified bodies, and said separator has, in a plane thereof, a reaction gas supplying communication hole and a reaction gas discharging communication hole for supplying and discharging said reaction gas to and from said reaction gas passages in each of said unit cells.

3. A solid polymer electrolyte fuel cell assembly according to claim 1, wherein a separator is interposed between adjacent two of said unified bodies, and said separator is formed of a metal plate having a shape of projections and depressions for forming said reaction gas passages.

4. A solid polymer electrolyte fuel cell assembly according to claim 3, wherein said separator has, on the side facing to one of the adjacent two of said unified bodies, fuel gas passages as said reaction gas passages, and also has, on the side facing to the other of the adjacent two of said unified bodies, oxidizing gas passages as said reaction gas passages.

5. A solid polymer electrolyte fuel cell assembly according to claim 1, wherein the flow direction of fuel gas passages as said reaction gas passages along the reaction plane of said unit cell is opposite to the flow direction of oxidizing gas passages as said reaction gas passages along the reaction plane of said unit cell.

6. A solid polymer electrolyte fuel cell assembly according to claim 1, wherein fuel gas passages as said reaction gas passages are provided in each of said unit cells in such a manner as to extend linearly along the reaction plane of said unit cell, and oxidizing gas passages as said reaction gas passages are provided in each of said unit cells in such a manner as to extend linearly along the reaction plane of said unit cell.

7. A solid polymer electrolyte fuel cell assembly, comprising a plurality of unit cells stacked to each other, said unit cells each having a unified body including an anode, a cathode, and a solid polymer electrolyte membrane disposed between said anode and said cathode, wherein a plurality of reaction gas passages are formed parallel in said cell assembly, in a direction in which said unit cells are stacked, for allowing at least one of a fuel gas and an oxidizing gas to flow through said unit cells in a same direction, wherein at least two of said unit cells have structures different from each other.

8. A solid polymer electrolyte fuel cell assembly according to claim 7, wherein said reaction gas passages provided in said at least two unit cells have cross-sections different from each other.

9. A solid polymer electrolyte fuel cell assembly according to claim 8, wherein the cross-sections of said reaction gas passages provided in said at least two unit cells are different from each other by making the depths, widths, or the number of reaction gas passages provided in one of said at least two unit cells different from the depth, widths, or the number of reaction gas passages provided in another of said at least two unit cells.

10. A solid polymer electrolyte fuel cell assembly according to claim 8, wherein the cross-section of one, disposed in proximity to said coolant passages, of said reaction gas passages are smaller than the cross-section of another, disposed apart from said coolant passages, of said reaction gas passages.

11. A solid polymer electrolyte fuel cell assembly according to claim 7, wherein a choked portion is provided in one, disposed apart from said coolant passages, of said reaction gas passages in order to make the flow rate of the one of said at least two reaction gas passages smaller than the flow rate of another, disposed in proximity to said coolant passages, of said reaction gas passages.

12. A solid polymer electrolyte fuel cell assembly according to claim 7, wherein at least two of said unit cells have unified bodies different from each other.

13. A solid polymer electrolyte fuel cell assembly according to claim 12, wherein one, disposed in proximity to said coolant passages, of said unified bodies includes a fluorine based membrane, and another, disposed apart from said coolant passages, of said unified bodies includes a hydrocarbon based membrane.

14. A solid polymer electrolyte fuel cell assembly, comprising a plurality of unit cells stacked to each other, said unit cells each having a unified body including an anode, a cathode, and a solid polymer electrolyte membrane disposed between said anode and said cathode, wherein a plurality of reaction gas passages are formed parallel in said cell assembly, in a direction in which said unit cells are stacked, for allowing at least one of a fuel gas and an oxidizing gas to flow through said unit cells in a same direction, wherein said plurality of reaction gas passages include fuel gas passages provided in said plurality of unit cells in such a manner as to communicate with each other in series, and oxidizing gas passages provided in said plurality of unit cells in such a manner as to communicate with each other in parallel.

15. A fuel cell stack, comprising a plurality of cell assemblies stacked with each other, said cell assemblies each comprising a plurality of unit cells stacked to each other, said unit cells each having a unified body including an anode, a cathode, and a solid polymer electrolyte membrane disposed between said anode and said cathode, wherein a plurality of reaction gas passages are formed parallel in said cell assembly, in a direction in which said unit cells are stacked, for allowing at least one of a fuel gas and an oxidizing gas to flow through said unit cells in a same direction, wherein at least two of said unit cells of said cell assembly have structures different from each other.

16. A method of supplying a reaction gas in a fuel cell, for use in a solid polymer electrolyte fuel cell assembly, said cell assembly comprising a plurality of unit cells stacked to each other, said unit cells each having a unified body including an anode, a cathode, and a solid polymer electrolyte membrane disposed between said anode and said cathode, wherein a plurality of reaction gas passages are formed parallel in said cell assembly, in a direction in which said unit cells are stacked, for allowing at least one of a fuel gas and an oxidizing gas to flow through said unit cells in a same direction, said method comprising the steps of:

supplying the reaction gas in parallel from reaction gas supplying communication holes into reaction gas passages of the unit cells to flow in said reaction gas passages;

after said reaction gas is used for reaction in said reaction gas passages, discharging said used reaction gas from said reaction gas passages into reaction gas discharging communication holes, wherein coolant passages are disposed on both sides of the unit cells in the stacking direction of said unit cells, and the flow rate and/or flow velocity of the reaction gas passages disposed in proximity to said coolant passages are larger than the flow rate and/or flow velocity of the reaction gas passages disposed apart from said coolant passages.

* * * * *